(12) United States Patent
Chu

(10) Patent No.: US 6,715,229 B2
(45) Date of Patent: Apr. 6, 2004

(54) FISHING FLOAT HAVING LIGHT DISPLAYING MEMBERS

(76) Inventor: Chang-Rong Chu, No. 46-1, Lane 81, Ta Ming Rd., Shen Kang Hsiang, Taichung Hsien (TW)

( * ) Notice: Subject to any disclaimer, the term of this patent is extended or adjusted under 35 U.S.C. 154(b) by 0 days.

(21) Appl. No.: 10/237,655

(22) Filed: Sep. 9, 2002

(65) Prior Publication Data

US 2003/0066229 A1 Apr. 10, 2003

Related U.S. Application Data

(63) Continuation-in-part of application No. 09/971,397, filed on Oct. 5, 2001.

(51) Int. Cl.[7] .............................................. A01K 75/04
(52) U.S. Cl. ...................................................... 43/17.5
(58) Field of Search ............................... 43/17.5; 315/32

(56) References Cited

U.S. PATENT DOCUMENTS

| | | | | |
|---|---|---|---|---|
| 4,337,402 A | * | 6/1982 | Nowakowski | 307/121 |
| 4,479,321 A | * | 10/1984 | Welstead | 43/17 |
| 4,823,496 A | * | 4/1989 | Powell | 43/17.5 |
| 5,036,615 A | * | 8/1991 | Lu | 43/17.5 |
| 5,615,512 A | * | 4/1997 | Wang | 43/17.5 |
| 5,937,566 A | * | 8/1999 | Buczkowski et al. | 43/17.5 |
| 5,974,721 A | * | 11/1999 | Johnson et al. | 43/17.6 |
| 5,979,101 A | * | 11/1999 | Muenchow | 43/17 |
| 6,079,144 A | * | 6/2000 | Morgan et al. | 43/17.6 |
| 6,122,853 A | * | 9/2000 | Genous-Moore | 43/17.5 |
| 6,138,398 A | * | 10/2000 | Livingston | 43/17 |

* cited by examiner

*Primary Examiner*—Charles T. Jordan
*Assistant Examiner*—Bret Hayes
(74) *Attorney, Agent, or Firm*—Charles E. Baxley

(57) ABSTRACT

A fishing float includes a hollow body with a first and a second electric power sets, and a conductive member received therein. A pendant is connected to an end of a resilient, whereas another end of the resilient is connected to one of the electric power sets, and located in a conductive member which is connected to another electric power set. Two caps each have an illuminating piece received therein and are respectively mounted to two ends of the body, one of the caps is movably mounted to the body and is pushed to form a circuit for the two respective illuminating pieces. The pendant swings when the bait is bitten by a fish and touches the conductive member to let the illuminating pieces light up.

3 Claims, 7 Drawing Sheets

FISHING FLOAT HAVING LIGHT DISPLAYING MEMBERS

FIELD OF THE INVENTION

This is a Continuation-In-Part application for applicant's former application with the Ser. No. 09/971,397, filed Oct. 5, 2001. The present invention relates to a fishing float that has a pendant connected to a resilient member and the pendent swings to contact a conductive member in the fishing float to activate two illuminating pieces on two ends of the fishing float.

BACKGROUND OF THE INVENTION

A conventional fishing float is made of cork, a hollow plastic ball or simply a tube which is able to float on the water surface so that when the bait is bitten by a fish, the float will be pulled into the water and the fisherman is notified by the movement of the fishing float. However, if the fishing site is dark and the movement of the float is not easy to be observed, a fishing float equipped with luminescent member can enable the fisherman to clearly observe the movement of the fishing float. Nevertheless, the luminescent member has a limited functional time. Some fishermen attach bells on the fishing line so that when the bait is bitten, the bells will ring to tell the fishermen, however, the bells will not only interrupt the fish bitting in the water but also affect other neighboring fishermen.

SUMMARY OF THE INVENTION

In accordance with one aspect of the present invention, there is provided a fishing float and comprises a hollow body including a first positioning section and a second positioning section located at two ends of the body. A first and a second electric power sets are respectively received in the first positioning section and the second positioning section. A conductive unit is received in the body and has a conductive member and a connection member, the connection member is connected between the second electric power set and the conductive member. An activation member is received in the hollow body of the fishing float and has a resilient member. A pendant is connected to a first end of the resilient member and a second end of the resilient member is connected to the first electric power set received in the first positioning section. The pendant is hanged in the hollow body by the resilient member and located in the conductive member.

A first cap interiorly equipped with a first illuminating piece is mounted to the second positioning section and a second cap interiorly equipped with a second illuminating piece is movably mounted to the first positioning section. Two notches are defined in an inner periphery of the second cap for engaging with a boss on the first positioning section. The second cap is able to move to contact or disconnect from the edge of the casing of the body, so as to close the circuit for the first and the second illuminating pieces.

The primary object of the present invention is to provide a fishing float that has a pendant connected to a resilient member and hanged in the fishing float so that when the fishing float shakes, the pedant contacts a conductive member to light up the illuminating pieces at two ends of the fishing float.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
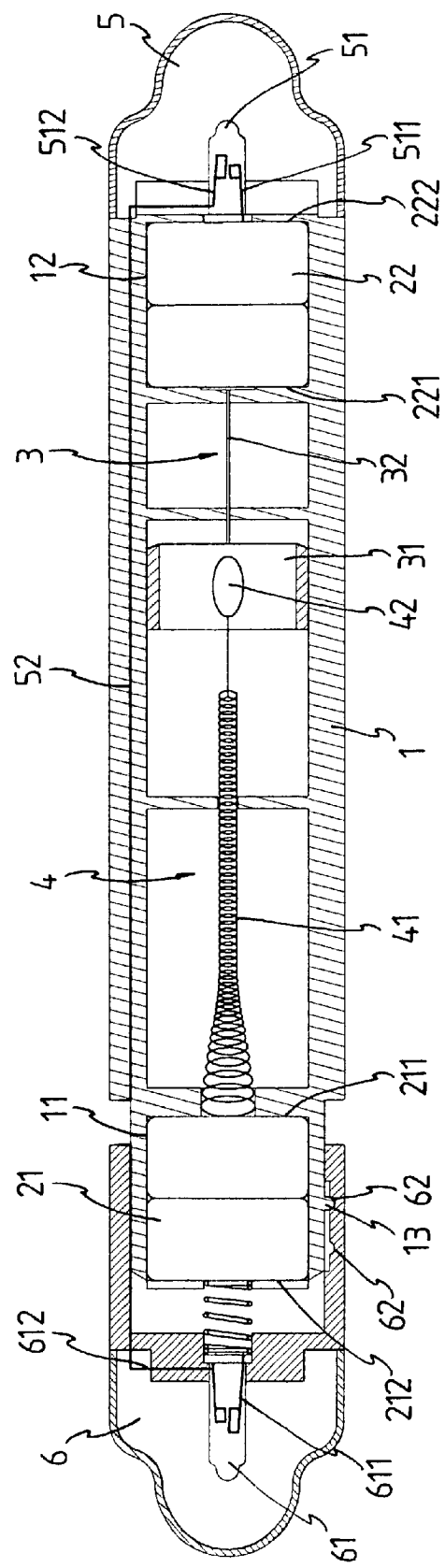
FIG. 1 is a cross sectional view to show the fishing float of the present invention.

Referring to FIG. 1, the fishing float of the present invention comprises a hollow body 1, and a first positioning section 11 and a second positioning section 12 are respectively located at two ends of the body 1. A boss 13 extends from an outer periphery of the first positioning section 11. A first and a second electric power sets 21, 22 are respectively received in the first position section 11 and the second positioning section 12.

A conductive unit 3 is received in the hollow body 1 and has a conductive member 31 and a connection member 32, the connection member 32 is connected between a negative end 221 of the second electric power set 22 in the second positioning section 12 and the conductive member 31.

An activation member 4 is received in the hollow body 1 and has a resilient member 41 and a pendant 42, the resilient member 41 is located in the hollow body 1, a first end of the resilient member 14 is connected to a positive end 211 of the first electric power set 21 and a second end of the same is connected to the pendant 42. The pendant 42 is hanged in the body 1 by the resilient member 41 and located in the conductive member 31, in case of oscillation of the hollow body 1, the pendant 42 will be caused to contact the internal surface of the conductive member 31 of the conductive unit 3 at regular intervals.

A first cap 5 interiorly equipped with a first illuminating piece 51 is mounted to the second positioning section 12 of the hollow body 1. One leg 511 of the first illuminating piece 51 is connected to a positive end 222 of the second electric power set 22 in the second positioning section 12 and another leg 512 of the first illuminating piece 51 is connected to a wire 52 which extending to an edge of the first positioning section 11 of the body 1.

A second cap 6 interiorly equipped with a second illuminating piece 61 is movably mounted to the first positioning section 11. Two notches 62 are defined in an inner periphery of the second cap 6 and both of which correspond to the boss 13 on the first positioning section 11. One leg 611 of the second illuminating piece 61 is connected to the positive end 212 of the first electric power set 21 in the first positioning section 11 and another leg 612 of the second illuminating piece 61 extends to an edge of the second cap 6.

Figure 2:
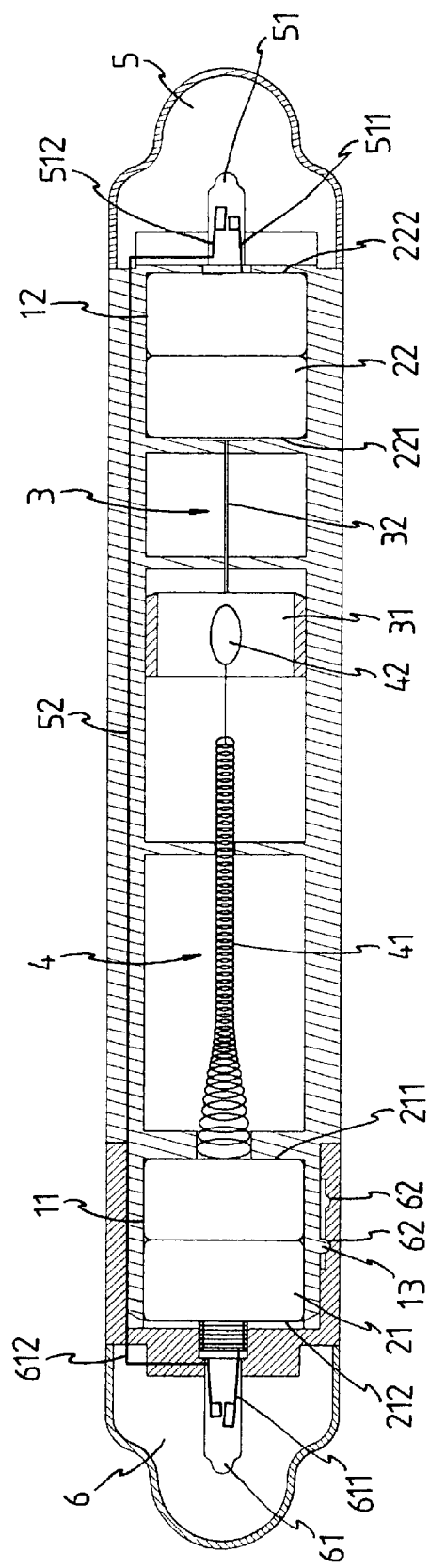
FIG. 2 is a cross sectional view to show the fishing float of the present invention, wherein the second cap is pushed to close the circuit of the two illuminating pieces.
Figure 6:
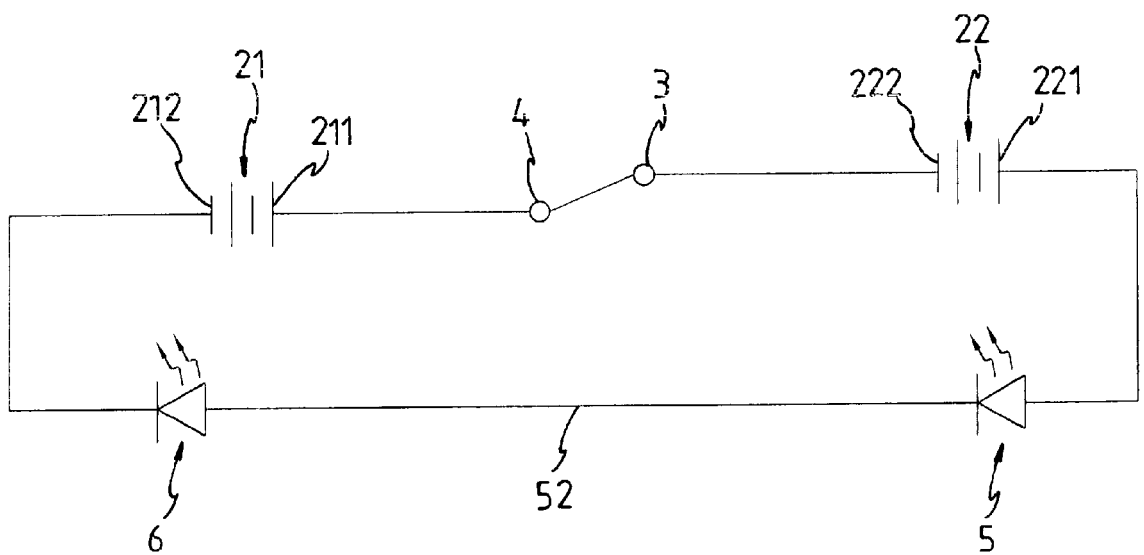
FIG. 6 shows the circuit of the two illuminating pieces.

As shown in FIG. 2, when pushing the second cap 6 toward the first cap 5, the edge of the second cap 6 is moved to contact the edge of the casing of the body 1. In other words, the two legs 511, 611 of the two illuminating pieces 51, 61 are in contact with each other to form the circuit as illustrated in FIG. 6.

Figure 3:
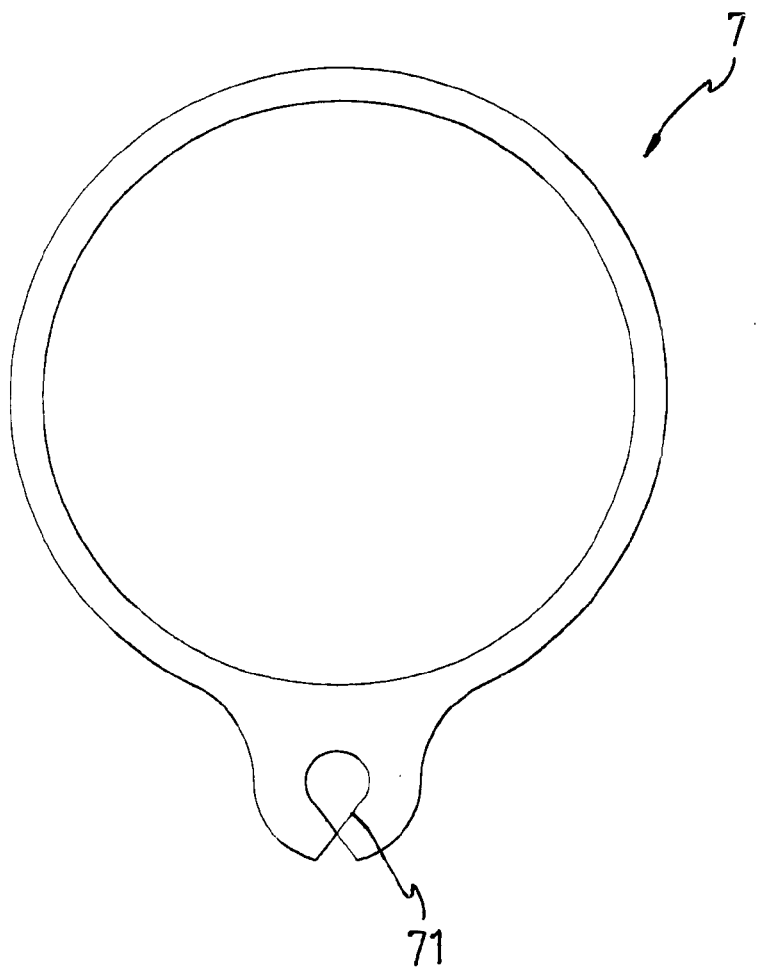
FIG. 3 shows a connection member for attaching the fishing float to the fishing rod.
Figure 4:
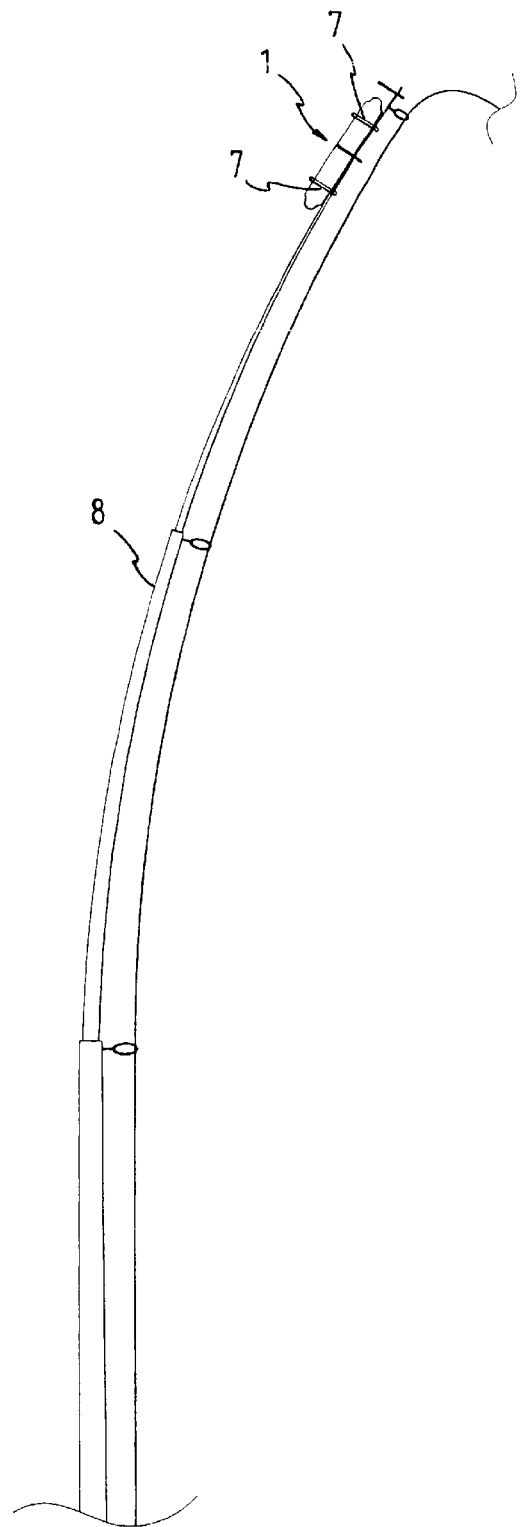
FIG. 4 shows the fishing float is attached to the fishing rod.

A coupling device 7 as shown in FIG. 3 is a ring-shaped member and is mounted to the body 1. The coupling device 7 has a securing portion 71 so as to attach the fishing float to a fishing rod 8 as shown in FIG. 4.

Figure 5:
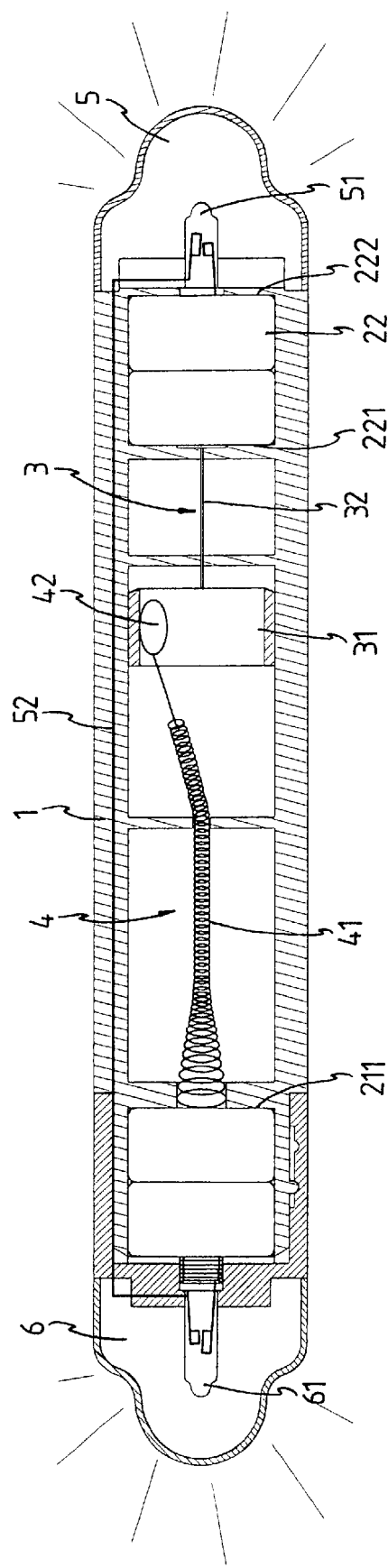
FIG. 5 shows the pedant swings and contacts the conductive member.

Referring to FIG. 5, the fishing float shakes when a fish bites the bait, the pedant 42 swings and contacts the conductive member 31 at regular intervals so as to form a complete circuit, and thus the first and the second illuminating pieces 51 and 61 will flash to signal the fisherman that the bait is bitten by a fish. When the second cap 6 is pulled away from the first cap 5, the circuit will not be close so as to save the electric power. The first and the second electric power sets 21, 22 can be mercury battery and the first and the second illuminating pieces 51, 61 can be bulbs or LEDs.

Figure 7:
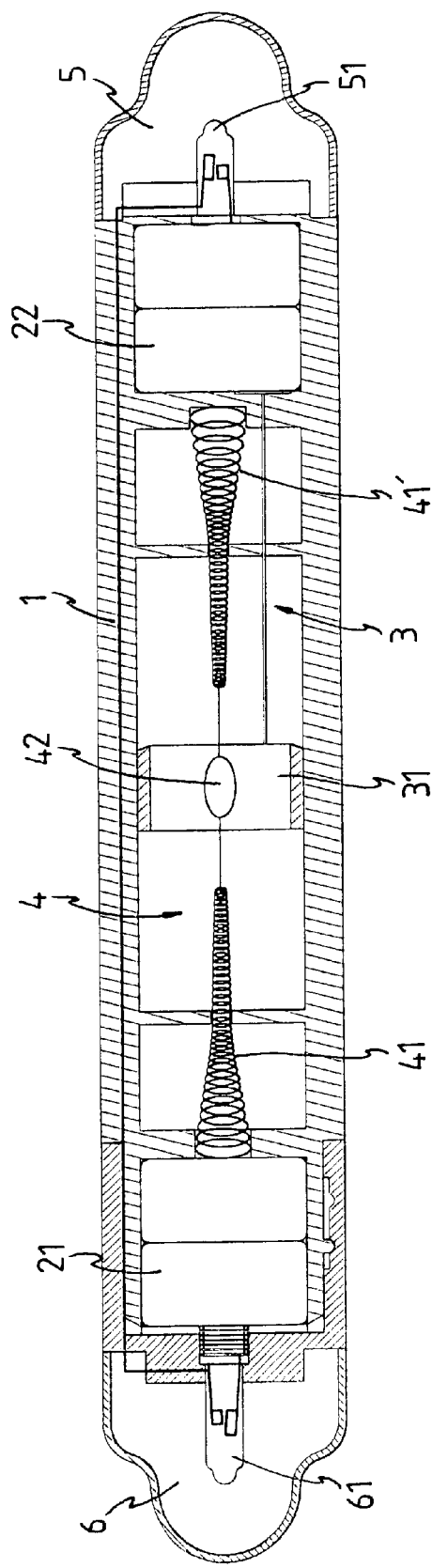
FIG. 7 shows the pedant is connected to two resilient members.

FIG. 7 shows that another resilient member 41' is additionally connected to the pedant 42, such that the pedant 42 is simultaneously connected between the two resilient member 41, 41'. By this way, the pedant 42 does not swing unless a certain amount of force is applied to the fishing float, so as to prevent undesired contact of the pendant 42 with the conductive member 31 caused by light wind.

While we have shown and described the embodiment in accordance with the present invention, it should be clear to those skilled in the art that further embodiments may be made without departing from the scope of the present invention.

What is claimed is:

1. A fishing float comprising:

a hollow body and a first positioning section and a second positioning section located at two ends of the hollow body, a boss extending from an outer periphery of the first positioning section, a first and a second electric power sets respectively received in the first and the second positioning section;

a conductive unit received in the hollow body and having a conductive member and a connection member, the conductive member being annularly disposed in the hollow body, the connection member connected between the second electric power set received in the second positioning section and the conductive member;

an activation member received in the hollow body and having a conductive resilient member and a pendant, the pendant being connected to a first end of the resilient member, a second end of the resilient member connected to the first electric power set received in the first positioning section, the pendant being hanged in the body by the resilient member and located in the conductive member, in case of oscillation of the hollow body, the pendant will be caused to contact the internal surface of the conductive member of the conductive unit at regular intervals;

a first cap interiorly equipped with a first illuminating piece and mounted to the second positioning section, one leg of the first illuminating piece connected to the second electric power set in the second positioning section and being connected to a wire which extending to an edge of the first positioning section of the body, and a second cap interiorly equipped with a second illuminating piece and movably mounted to the first positioning section, two notches defined in an inner periphery of the second cap both of which designed for engaging with the boss on the first positioning section, one leg of the second illuminating piece connected to the first electric power set in the first positioning section and another leg of the second illuminating piece extending to an edge of the second cap, the second cap being able to move to contact the edge of the casing of the body to contact the two legs together.

2. The fishing float as claimed in claim 1 further comprising a coupling member device mounted to the body and the coupling device having a securing portion.

3. The fishing float as claimed in claim 1 further comprising another resilient member connected to the pendant.

* * * * *